United States Patent [19]
Ruoff, Jr.

[11] 3,986,007
[45] Oct. 12, 1976

[54] METHOD AND APPARATUS FOR CALIBRATING MECHANICAL-VISUAL PART MANIPULATING SYSTEM

[75] Inventor: Carl F. Ruoff, Jr., Dayton, Ohio

[73] Assignee: The Bendix Corporation, Southfield, Mich.

[22] Filed: Nov. 28, 1975

[21] Appl. No.: 636,069

[52] U.S. Cl.............................. 235/151.1; 444/1; 178/6.8; 29/407; 29/587; 250/201
[51] Int. Cl.² .......................................... H04M 7/18
[58] Field of Search............ 235/151, 151.1, 151.11; 178/6.8; 29/587, 407; 356/172; 250/201

[56] References Cited
UNITED STATES PATENTS

| | | | |
|---|---|---|---|
| 3,326,176 | 6/1967 | Sibley | 29/407 |
| 3,796,497 | 3/1974 | Moore et al. | 356/152 |
| 3,909,600 | 9/1975 | Hohn | 235/151.11 |

OTHER PUBLICATIONS

"2-D Area Array Solid-State Feedback Automatic Wafer Alignment System," in *IBM Technical Disclosure Bulletin*, vol. 17, No. 10, Mar. 1975, pp. 2890–2892.
"Learning Hardware–Software System For The Recognition and Pick Up of Objects," in *IBM Technical Disclosure Bulletin*, vol. 17, No. 7, Dec. 1974, pp. 2144–2148.

Primary Examiner—Eugene G. Botz
Attorney, Agent, or Firm—John R. Benefiel

[57] ABSTRACT

An automaton includes a work part supporting and manipulating system having sensors which provide signals indicative of the position of the work holder in a first coordinate system and a television system which can observe a part and generate signals representative of the position of the part in the television system's coordinate system. A subsystem for generating conversion factors used to translate positions in the vision system coordinates into the manipulating system coordinates receives the output of both the manipulator sensors and the vision system while the manipulator moves a target through a series of points along a line. The subsystem determines the angle of rotation between the two coordinate systems and the distance from the origin of one system to the origin of the other system through calculations involving lines drawn through the points in the vision system and manipulating system coordinates. It also calculates a length scaling factor representing the ratio between an observed distance in the vision system and in the manipulating system.

7 Claims, 6 Drawing Figures

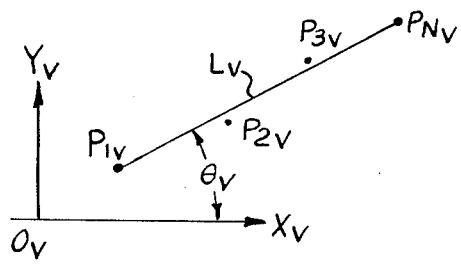
$$\theta_T = \theta_M - \theta_V$$
$$F_L = \frac{M_I - M_P}{P_{I_V} - P_{N_V}}$$
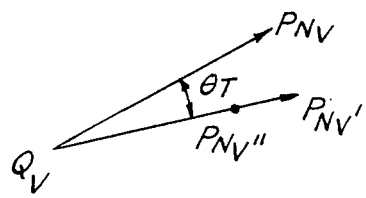
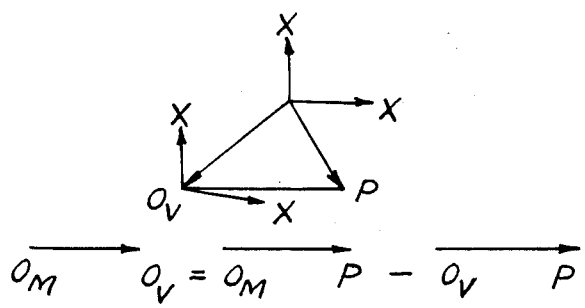
$$\overrightarrow{O_M O_V} = \overrightarrow{O_M P} - \overrightarrow{O_V P}$$
FIG.3

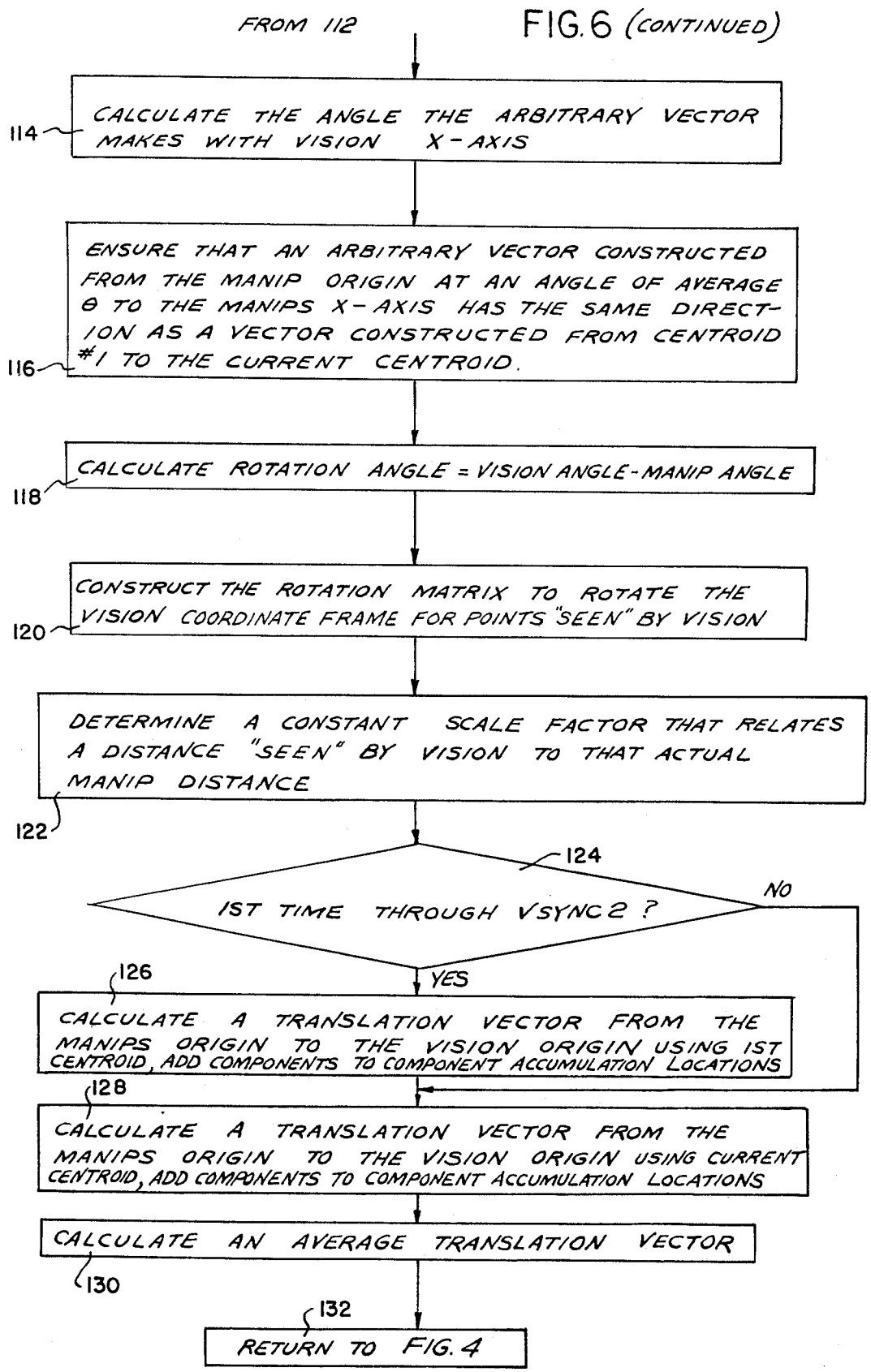

METHOD AND APPARATUS FOR CALIBRATING MECHANICAL-VISUAL PART MANIPULATING SYSTEM

BACKGROUND OF THE INVENTION

I. Field of the Invention

This invention relates to workpiece manipulating systems having the ability to observe a workpiece with a television subsystem and more particularly to a method of and apparatus for generating transformation factors for translating measurement in the vision coordinate system to equivalent measurements in the manipulator coordinate system.

II. Description of the Prior Art

A variety of commercially available workpiece manipulators exist which are capable of grasping a part and moving it through three-dimensional space by means of coordinated motions along separately controlled axes. It has recently been proposed that such systems be equipped with optical-electrical image converter systems and means for analyzing the output of the image converter to determine the outline and location of a part within a field of motion of the manipulator. Outputs of this vision system may be used to control the manipulator and to inspect and identify parts to be manipulated.

Since the measurements of position and distance made by the vision system will inherently differ from equivalent measurements made by the manipulator sensors because different measurement scales are used in the two systems, it is desirable to provide means for converting signals representative of positions and distances as generated by the vision system into signals representative of the same measurements in the manipulating system coordinates. While the necessary conversion factors might be determined on a a priori basis from a knowledge of the parameters of the two measurement systems, in practice it is found that both systems exhibit some instability over a period of time and this drift reduces the accuracy of such calculated transformation parameters. Moreover, it may be desirable to separately support the vision and manipulation systems so that the two do not share incidental motions caused by support vibrations and the like. Also, it may be desirable to reposition the vision system relative to the manipulation circuitry from time to time which would require a recalculation of the conversion factors.

SUMMARY OF THE PRESENT INVENTION

The present invention is addressed to a method of determining the constants of transformation for converting vision system measurements into the coordinates of the manipulating system so that these signals may be used in controlling a manipulating system and to a system for practicing the method. The method does not require a knowledge of the characteristics of the two measurement systems or depend upon the accuracy of this knowledge. It is capable of generating conversion factors based on the instantaneous characteristics of the two systems and their positions relative to one another at the time of practice of the method. Moreover, the method is sufficiently simple that it can be performed on a regular basis so that inaccuracies due to drift of the systems are minimized.

Broadly, the method of the present invention involves supporting a target, of such nature that its position is readily determinable with a high degree of accuracy by the vision system, in the work holder of the manipulating system. The manipulating system is then controlled to move the target through a series of positions which lie in a straight line relative to the manipulating system coordinates. The outputs of the manipulating system sensors which define the position of the work holding fixture are recorded at each of the positions. Likewise, the vision system is controlled to generate the coordinates of the center of the target at each of the points in its own coordinate system. The two resulting series of data are then used to compute equations of lines passing through the points on a least squares basis. The angle between these two lines is effectively the angle between the two coordinate systems, the X-Y planes of which are assumed parallel. Next, a linear scale factor between the two systems is derived by calculating the distance between the beginning and end point of the position sequence in each coordinate system. The ratio of these distances will later be used to convert the length of a line in a vision system to the equivalent length of a line in the manipulator system coordinate. A translation vector extending from the origin of the manipulator coordinate system to the origin of the vision coordinate system is then calculated by rotating a vector extending from the vision system origin to the end point of the line in the vision system through the previously calculated angle between the systems; multiplying that vector extending by the scale ratio; and subtracting that vector from the vector extending from the manipulator system origin to the same point.

To convert a vector in vision system coordinates to an equivalent vector in the manipulator system coordinates the vision vector is first multiplied by the length ratio, then rotated by the angle between the coordinate systems and then summed with the vector between the origin of the two systems to derive the equivalent manipulation system vector.

In the preferred embodiment of the invention, which will subsequently be disclosed in detail, the signals representative of the positions of the target points in the two coordinate systems are provided to a general purpose computer programmed to process the data coordinates with the method of the preferred embodiment to derive the conversion factors. In alternative embodiments the computations might be performed by hard-wired digital circuits, suitably arranged analog computation elements, or combinations thereof alone or with suitable general purpose computer subsystems. The choice between the hard-wired and programmed general purpose implementations is largely an economic decision.

Other objectives, advantages and applications of the present invention will be made apparent by the following detailed description of the preferred embodiment of the invention. The description makes reference to the accompanying drawings in which:

FIG. 3 is a vector diagram illustrating the process of the present invention;

Figure 1:
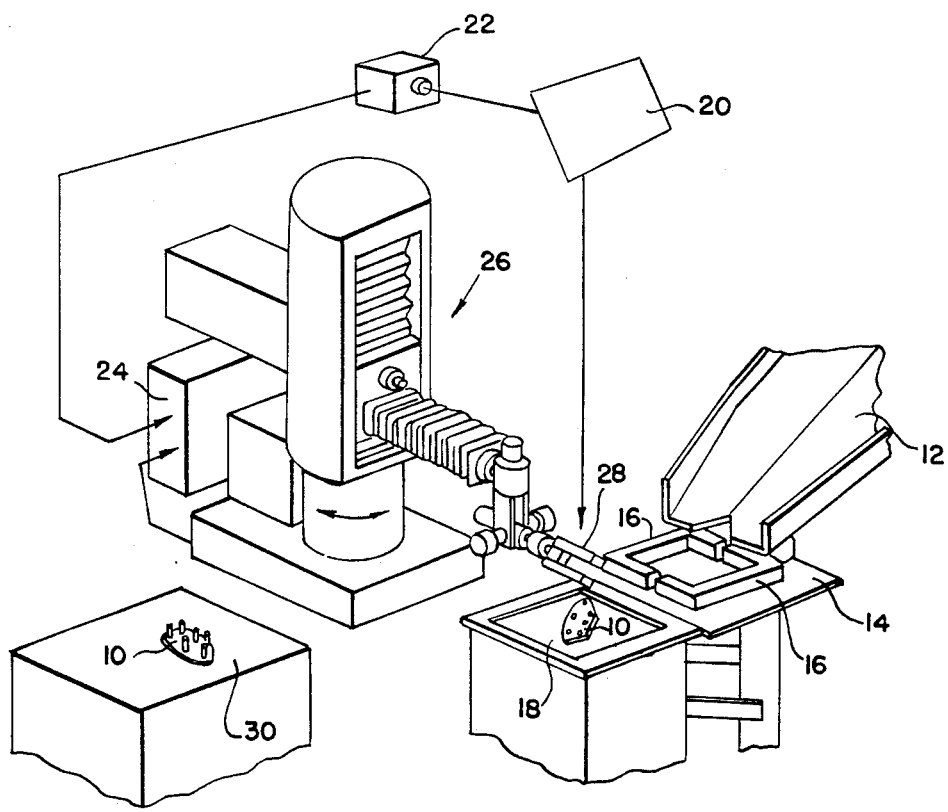
FIG. 1 is a perspective view of a workpiece manipulating system employing an optical-electrical image converter vision system and employing apparatus for practicing the method of the present invention to generate factors useful to convert signals representative of positions and distances in the vision system coordinates to equivalent signals in the manipulator system coordinates.

Referring to the drawings, the systems of the present invention, which practices the method of the present invention, forms a subsystem of the system broadly illustrated in FIG. 1 which is adapted to engage and manipulate workpieces 10 which are provided to it in a random, unoriented manner. The parts are illustrated as being dropped one-by-one, by suitable mechanism (not shown) down a slide 12 so that they fall onto a support surface 14 within an area bounded by a pair of separable pusher arms 16. At an appropriate time in the work cycle the pusher arms are actuated by suitable mechanism (not shown) to horizontally move a single part 10 onto a horizontal translucent presenter stage 18. The arms 16 then separate and retract to their position over the support 14 leaving the single part 10 supported on the presenter stage 18. The part is in an unoriented position and must be moved into an oriented position before it may be provided to subsequent operating apparatus such as a metal working press or the like.

An appropriate source of illumination (not shown) is preferably disposed below the translucent presenter stage 18 so that the silhouette of the part 10 is provided in sharp contrast to a mirror 20 supported directly above the presenter stage. The mirror 20 reflects the image of the presenter stage and the silhouette of the part 10 to an optical-electric image converter 22, preferably taking the form of a vidicon tube. This tube is controlled so that the image of the presenter stage, as created on the tube by its lens system, is repeatedly scanned. The electrical signals generated during the scan are provided to a control subsystem 24 which preferably contains a suitably programmed general purpose computer.

The computer 24 analyzes the signals from the converter 22 to determine the primary outline of the part 10 as it rests on the presenter stage 18, and then the centroid of that outline. The outline of the part is further analyzed to determine the location of certain characteristic points on the outline, relative to the centroid of the part.

This information is used by the computer 24 to generate control signals for a manipulator, generally indicated at 26. The manipulator carries a set of jaws 28 which are adapted to engage the workpiece 10. The position of the jaws may be controlled in a number of respects by appropriate motions of the manipulator elements. That is, the jaws may be lifted and lowered, moved horizontally along a pair of perpendicular axes, rotated, and inclined, etc. Based on the signals provided by the computer 24 the manipulator is caused to engage the workpiece 10, lift it from the presenter stage, and to move it to a working station 30 and place it thereon in an oriented position. A variety of systems having the capabilities described above have therefore been proposed and built.

The task described above is quite elementary for systems of this type and the system may perform more complex tasks, for example, the vision system might be adapted to recognize another part to be assembled with the workpiece 10 and to control the motion of the workpiece to bring the parts into assembled relationship.

The computer is capable of deriving signals representative of positions and distances by analysis of the output signals of the image convertor 22 and the manipulator 26 includes appropriate sensors that generate electrical signals representative of the positions of its various elements and provides these to the computer 24 which analyzes them to determine positions and distances of the operating elements. Since the ultimate function of the system is manipulation of the workpieces it is necessary to convert the position and distance signals derived by the vision system into the manipulator system coordinates in order to provide appropriate control signals for the manipulator elements. The general purpose computer 24 must have available transformation coordinates which will allow position and distance signals derived from an analysis of signals from the image convertor 22 to be translated into the machine coordinates. The program further includes sections which control the computer 24 to derive those transformation factors utilizing the method of the present invention.

Figure 2:
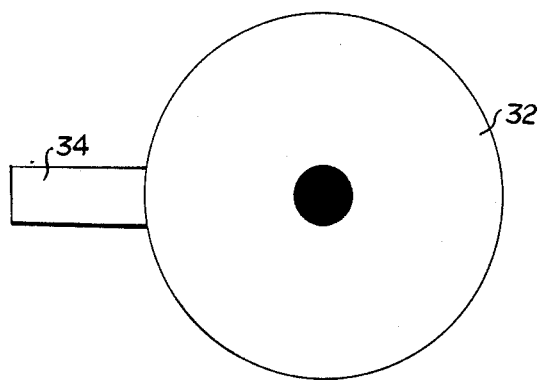
FIG. 2 is a plan view of the target used with the preferred embodiment of the invention.

The first step in generating the transformation factors is to load a target 32, illustrated in FIG. 2, into the workpiece engaging jaws 28 of the manipulator. The target consists of a circular section of transparent plastic having a short handle 34 projecting from one end and an opaque circular target area 36 formed in the center of the circular section.

The jaws 28 of the manipulator are controlled to engage the handle 34 of the target so that the central section 32 extends out beyond the jaws. The jaws are controlled so that the target 32 is disposed parallel to the presenter stage 18 and closely above it. The manipulator is next controlled to cause its arm to successively move through a series of points. The rotation of the manipulator arm about the vertical or Z axis is maintained constant through all these points and the horizontal attitude of the target 32 and its elevation above the presenter stage 18 are maintained constant for all of these points.

The machine sensors define a position in global coordinates; that is a three-dimensional set of polar coordinates specifying the vector distance from the origin of the manipulator coordinate system to the point and the angle that vector assumes with respect to each of the principle rectangular axes. Thus when work engaging fixture 28 is extended along a radial line between the successive points, in theory the only coordinate difference between the successive points will be in the length of the radius, with the angles remaining constant. However, as a matter of practice, a certain drift may occur in the angle that the support arm makes relative to a line in the horizontal plane and the system must record this angle at each point along the line. It is assumed that the inclination of the arm remains constant and that the manipulator system, vision system and respective coordinate systems have parallel X-Y planes.

Accordingly, as the manipulator system moves the target 32 through a series of points in the X-Y plane, bearing substantially constant angle to the X-Z plane, the length of the radius vector and the angle of the radius vector relative to the X-Z plane in the X-Y plane is recorded for each point. This is all performed in accordance with an appropriate program provided for the computer 24.

At the same time the program controls the computer 24 to analyze the output of the image converter 22 so as to determine the coordinates of each point in the image plane of the camera system. These measurements will typically be in rectangular coordinates, representing the X and Y coordinates of the point relative to the origin of the vision system, in the two-dimensional vision plane, which is parallel to the presenter stage.

Using these two sets of measurements as data the computer 24 is controlled by the program to generate the transformation factors which may be subsequently used to translate vision system coordinates into manipulator system coordinates.

FIG. 3 illustrates the process of deriving the transformation factors by vector diagrams. Assume that the target is moved to N points which are viewed in the vision system coordinate system as $P_{IV}, P_{2V}, P_{3V}$, to $P_{NV}$ relative to the vision system coordinates $X_V Y_V$. A line, $L_V$ is fitted to these points using the method of least squares and the angle that this line makes relative to the X axis of the vision system is calculated as $\theta_V$. The same points are called $P_{1M}, P_{2M}, P_{3M}$ and $P_{NM}$ in the manipulator system. The measurements of the angle that the manipulator system arm makes with the X–Z plane in the X–Y plane at each of the points are averaged resulting in an angle in the manipulator system coordinates of $\theta_M$. The first transformation factor, $\theta_T$, the angle in the X–Y plane between the vision system and manipulator system coordinate axes is equal to the angle between $\theta_M$ and $\theta_V$. Next the ratio of a length in the manipulator coordinate system to the same length in the vision coordinate system is derived by dividing the measured distance from the first point to the last point in the manipulator system coordinates ($M_1-M_P$) by the distance between the first and last points as determined by the vision system ($P_{IV}-P_{NV}$). This length factor is termed $F_L$.

Next the vector in the vision system from the origin of the vision system $O_V$ to the last point $P_{NV}$ is rotated through the angle $\theta_T$ to derive the vector $P_{NV'}$ which is then multiplied by the linearzation factor $F_L$ to derive $P_{NV''}$. This point $P_{NV''}$ is the same point as $P_{NM}$ at the last point on the line series as determined by the manipulator system.

Finally a vector extending from the origin of the manipulator system to the origin of the vision system is derived by subtracting the vector from the origin of the vision system to point $P_{NV''}$ from the vector extending from the origin of the manipulator system to point $P_{NM}$. This is the final conversion factor. A point in the vision system coordinate system may then be transformed to a point in the manipulator system coordinate system by rotating the vector from the origin of the vision system to the point in the vision system through the angle $\theta_T$; multiplying the length of that vector by the factor $F_L$, and then adding the vector extending between the origins of the two systems to the vector of the transformed point in the vision system.

Figure 4:
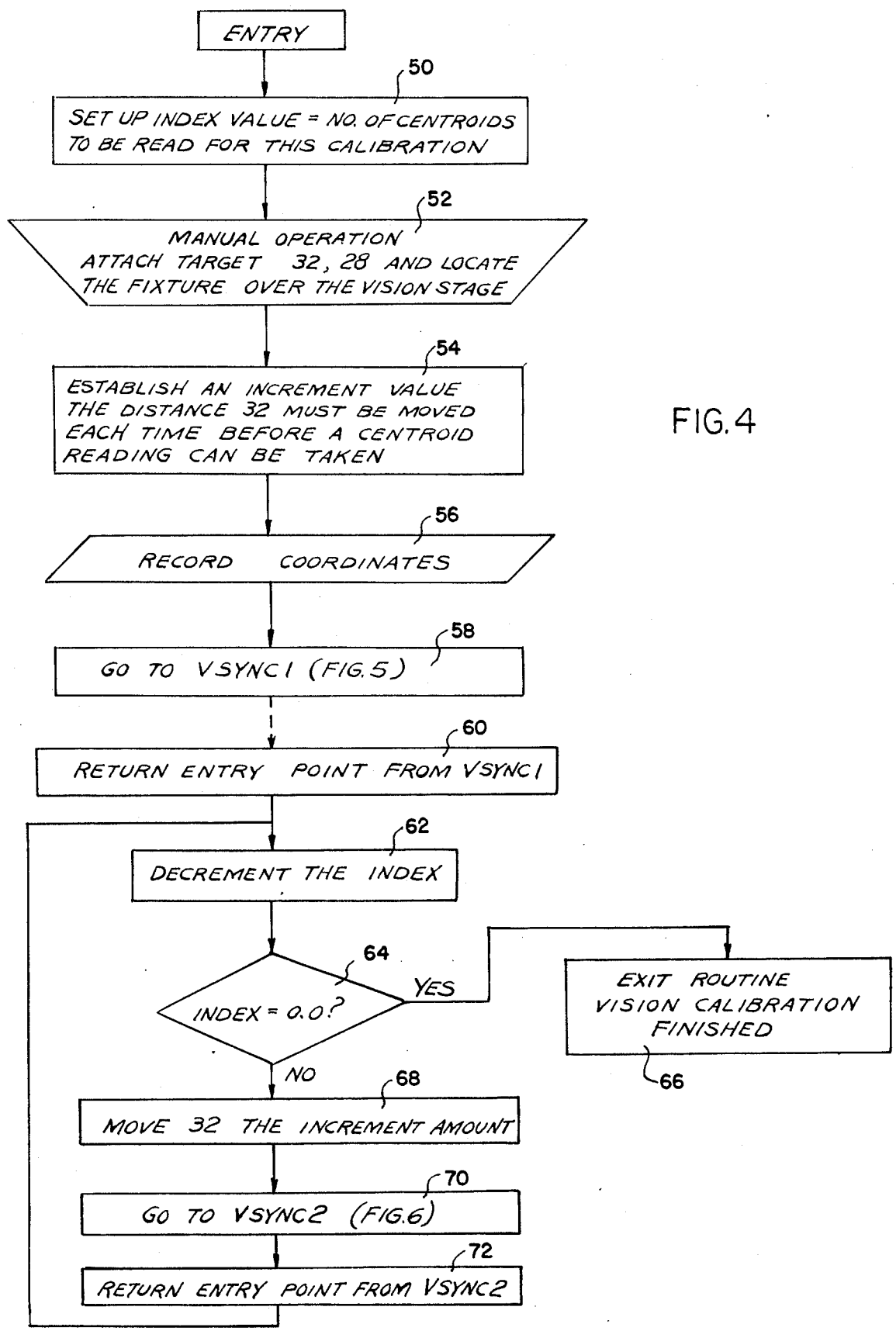
FIG. 4 is a flow chart of the overall control routine utilized by the general purpose computer forming part of the system illustrated in FIG. 1, for practicing the present invention.
Figure 5:
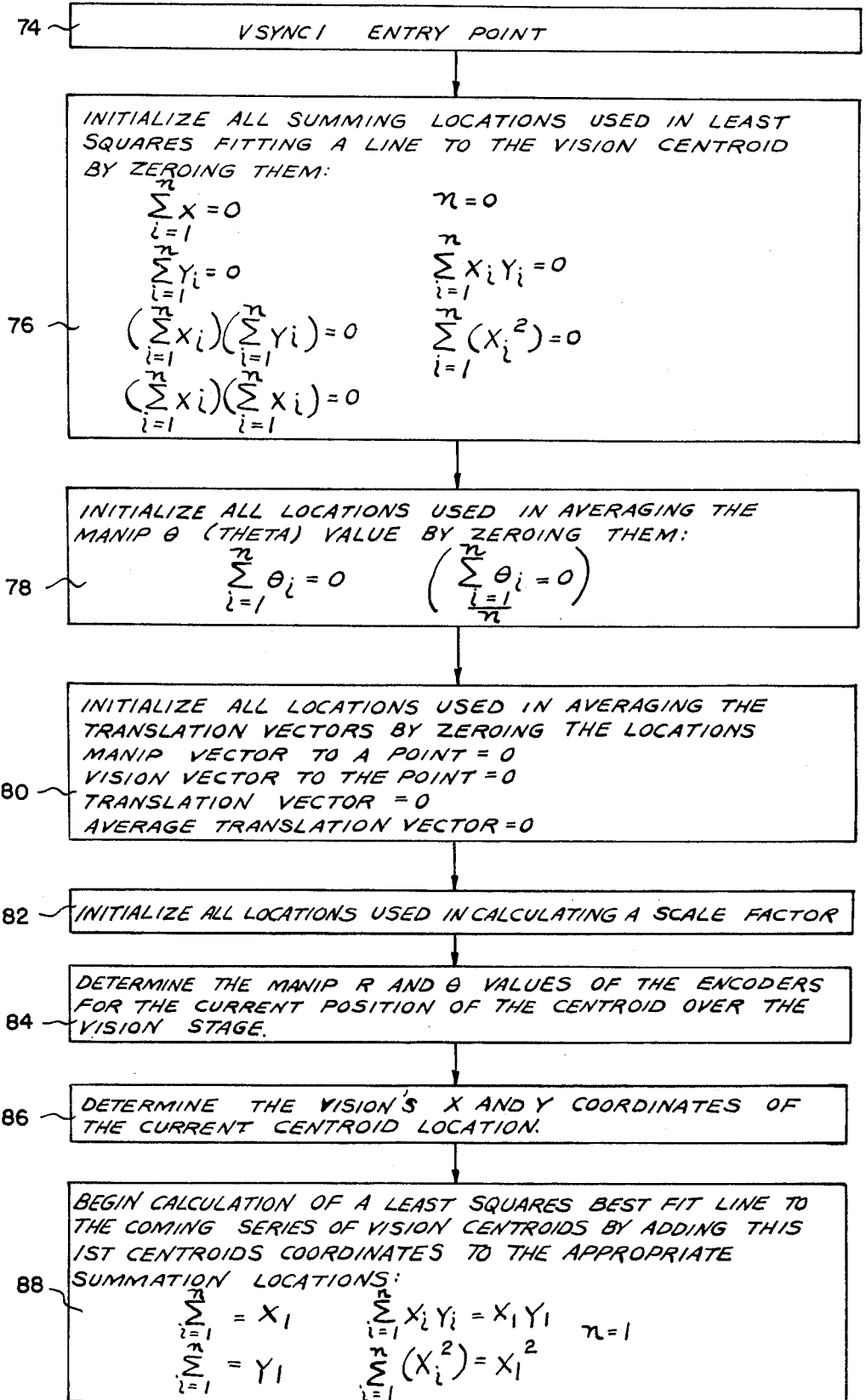
FIGS. 5 and 6 are flow charts of subroutines called for by the routine of FIG. 4.
Figure 6:
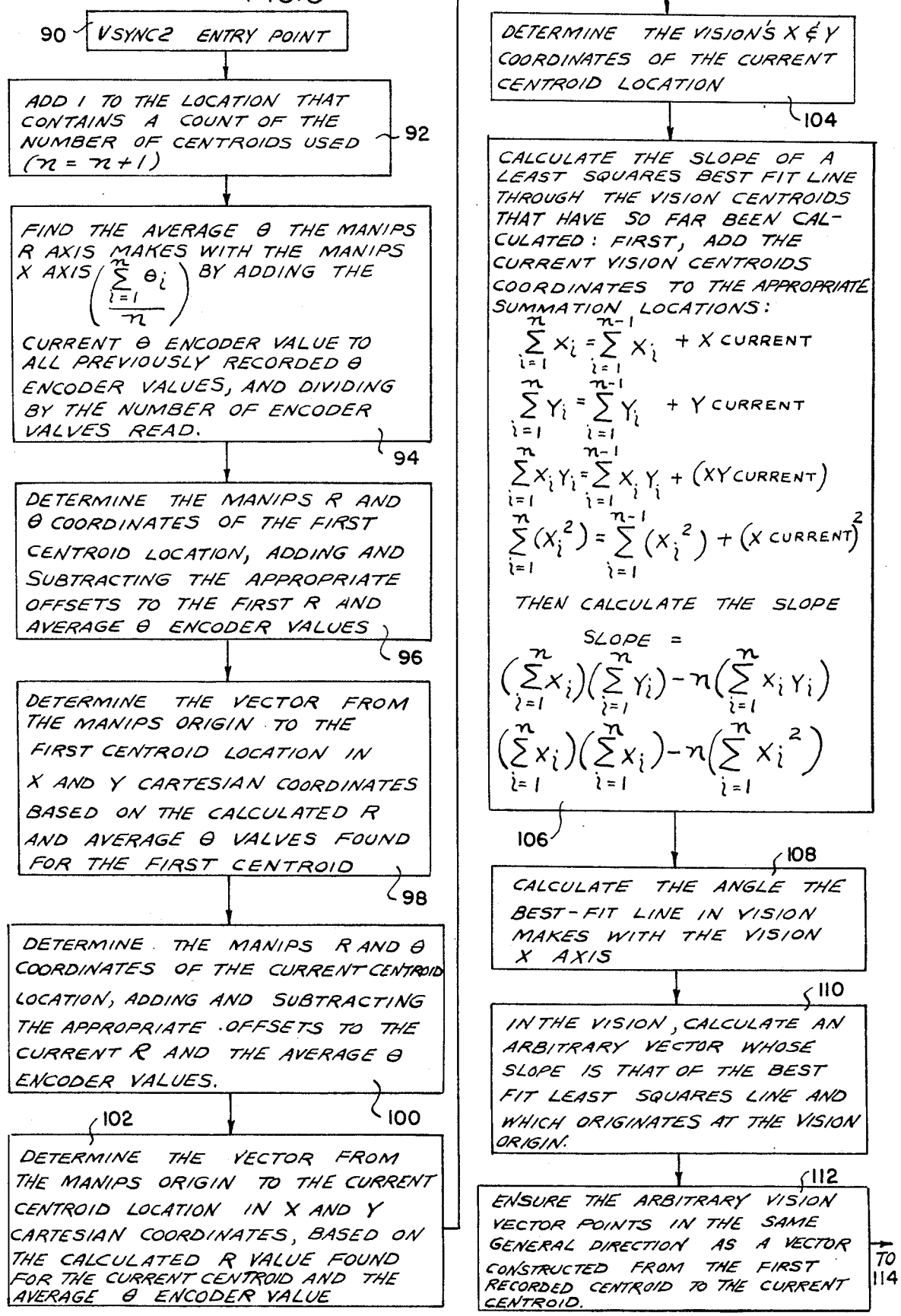

The flow charts of FIGS. 4–6 outline the steps followed by the computer 24 under control of its stored program, to generate these transformation factors.

Referring to FIG. 4, the first step 50 upon entry of the program is to set up an index value indicating the number of points along the line to be read for this particular calibration procedure. Next, at 52, the system provides a signal to the operator indicating that the manual operation consisting of attaching the target 32 to the workpiece 28 and locating the fixture over the vision stage 18 is to be accomplished. The operator, in step 54, establishes an increment value equal to the distance between each of the points on the line. Next, at 56, the manipulator is controlled to move to the first point and the coordinates of that point in the vision and manipulator systems are recorded. The program then, at 58, calls for a subroutine entitled VSYNC1 which is disclosed in detail in FIG. 5. That subroutine will be described subsequently.

When return is made from the VSYNC1 program, at 60, the index value is decremented at 62 to indicate that one point has been processed. Next, at 64, the index value is tested to determine if it is zero. If it is zero, the system enters an exit routine 66. If the index value is still nonzero the manipulator is controlled to move the target 32 by one increment, in box 68, and the subroutine entitled VSYNC2, disclosed in detail in FIG. 6, is entered in box 70.

Upon return from VSYNC2 at 72, box 62 is again entered, decrementing the index. This process continues until the index value is reduced to zero and the routine is completed.

The VSYNC1 program of FIG. 5 is an initialization routine particularly addressed to the problem of fitting a line to the series of points as detected by the manipulating system sensors and the vision system, through use of the least squares method.

This method defines and calculates the slope of a line in the X–Y plane ($\Delta X/\Delta Y$) passing through a series of points $X_1, X_2 \ldots X_N; Y_1, Y_2 \ldots Y_N$ in accordance with the following equation:

$$\text{SLOPE} \frac{\left(\sum_{i=1}^{n} X_i\right)\left(\sum_{i=1}^{n} Y_i\right) - n\left(\sum_{i=1}^{n} X_i Y_i\right)}{\left(\sum_{i=1}^{n} X_i\right)\left(\sum_{i=1}^{n} X_i\right) - n\left(\sum_{i=1}^{n} X^2_i\right)}$$

WHERE:

$n$ = number of points used $\sum_{i=1}^{n} X_i$ = sum of all the points' $X$ coordinates $\sum_{i=1}^{n} Y_i$ = sum of all the points' $Y$ coordinates.

Box 74 is the entry point to the VSYNC1 routine from box 58 of FIG. 4. The first step, defined in box 76, is to initialize the memory locations which are to be used as summing points in the least squares method, by zeroing them. Seven such storage locations are utilized:

$$\sum_{i=1}^{n} X_i = 0 \qquad n = 0$$

$$\sum_{i=1}^{n} Y_i = 0 \qquad \sum_{i=1}^{n} X_i Y_i = 0$$

$$\left(\sum_{i=1}^{n} X_i\right)\left(\sum_{i=1}^{n} Y_i\right) = 0 \qquad \sum_{i=1}^{n} \left(X_i^2\right) = 0$$

$$\left(\sum_{i=1}^{n} X_i\right)\left(\sum_{i=1}^{n} X_i\right) = 0$$

Next, the program moves to box 78 where those memory locations which are used to determine the average value of the angle $\theta_M$ that the manipulator arm makes with the X-Z plane at each of the target points. These two locations store the sum of the $\theta_M$ values and that value divided by the number of $\theta_M$ values.

Next, at box 80, the program zeros or initializes the four vector memory locations used in averaging the following translation vectors; vector from manipulator system origin to a point; vector from vision system origin to the point; vector from manipulator system origin to vision system origin; and resultant average translation vector. Next, at box 82, the program initializes those memory locations used in calculating the scale factor between the two systems.

The system is now ready to begin its actual operating routine and in the next series of program steps, illustrated in box 84, the system determines the value of the angle $\theta_M$ which the manipulator arm makes with the X-Z plane, and the value R, equal to the distance of the target 32 from the manipulator system Z axis, for the first target location. These readings are derived directly from the manipulator sensors and for the present ignore the target off sets. This is considered point number 1 and this value will be averaged in with all succeeding values and the average data is used in calculating both the translation vector and the angle of rotation between the two coordinate systems.

Next the system performs the tasks illustrated in box 86 wherein the coordinates of the same point are determined in the vision system's X and Y coordinates. This is done by causing the camera to take a picture of the target 32 and then analyzing the output of the image converter to determine the outline of the central opaque circle 36 and finally calculate the centroid of that area. The measurements of this centroid in the vision system are saved for later use. Next, at box 88, the system begins the calculation of the least squares best fit line to the coming series of vision centroids by adding the first centroid's vision coordinates and calculated values to the five appropriate summing locations as initialized in box 76. When this is completed, return is had from box 88 to the routine of FIG. 4.

Following that routine the index value is decremented, causing the manipulator system to move the target 32 by the increment value over the R axis. Entry is then had to the VSYNC2 routine beginning at box 90. The first operational step of VSYNC2, indicated at box 92, is to increment by one the storage location that contains the count of the number of points used. This storage location was previously set to zero in performance of the operation outlined in box 76.

Next, in block 94, the value of $\theta_M$ is added to the memory locations which store and sum the $\theta_M$ values, and an average value of $\theta_M$ is calculated. This is performed in box 94.

Next increments are summed with the readings of the R and $\theta_M$ sensors, as stored in block 84 for the first point taken, to obtain the actual position of the centroid of the target mark 36 which differs from the physical position of the workpiece holder because of the physical configuration of the target. These offset values have previously been stored in appropriate memory locations. They are determined by actual measurements of the target relative to the workpiece holder. This operation is illustrated in box 96.

The program then proceeds to block 98 wherein the program determines the length and angle of the vector in the XY plane, from the manipulator system origin to the first centroid location. The same two operations are then performed for the current centroid readings as determined by adding the offsets to the current R and average $\theta$ encoder in block 100 and determining the vector in X and Y coordinates from the manipulator system origin to that centroid in block 102. Next the X and Y coordinates of the current centroid location, as determined by the vision system, are generated by causing the vision system to take a picture of the target, to determine the outline of the circle 36 on the target and determine the X and Y coordinates of the centroid of that outline. This is accomplished by programming identified with block 104.

At this point the vision system has developed coordinates of two or more separate target points and the system calculates the slope of the least squares best fit line through those centroids. This is done by adding the current vision centroid coordinates to the appropriate storage summation locations and calculating the slope in accordance with the previous formula. This is performed in block 106.

In the next block, 108, the system converts the slope of this best fit line through the points so far determined into the angle between that line and the vision system X axis. The angle that the same line makes with the manipulator system X axis is averaged value of $\theta_V$. The amount the vision coordinate axes need to be rotated to bring them parallel to the manipulator system coordinate axes is the difference between the two angles $\theta_M$ and $\theta_V$.

As the first step of calculating this angle a routine located in block 110 calculates a vector of arbitrary length having the same slope as the best fit least square line through the points as seen in the vision system, and originating at the origin of the vision system. A routine illustrated in block 112 assures that this vector calculated points in the same general direction as the motion of the target between the first point and its current position. This is done by taking the scalar product of the arbitrary vector from the origin of the vision system, having the slope of the best fit line, and a vector constructed from the first recorded centroid to the current centroid. If the scalar product is greater than zero these two vectors have the same direction; if they have opposite directions, the scalar product is less than zero and the arbitrary vector must be multiplied by $-1$ in order to rotate it through 180° about the origin.

Next the system calculates the angle that this vector makes with the vision system X axis in block 114. Then the system determines the direction of a vector of arbitrary length constructed from the origin of the manipulator system coordinate axes at an angle of average $\theta$ to the manipulator system's X axis. This has the same direction as the vector constructed from the centroid number 1 to the current centroid. The direction is determined by comparing the R coordinate of the centroid number 1. If the R value of the latest centroid is greater than that of the first centroid, then $\theta$ is the correct angle for this arbitrary vector. Otherwise, the angle used must be 180° minus the average $\theta$. This is illustrated in block 116.

Finally, the system calculates the rotation angle between the vector in the vision and the manipulator systems by subtracting the angle of the vector in the manipulator system coordinates, as calculated in block 116, from the angle of the vector in the vision system as calculated in block 118. That is we are looking at the same vector (except for scale) in two coordinate frames.

The program next constructs a 2 × 2 matrix which may be used to rotate a point in the vision system coordinate axis through the angle determined in block 118. The two-dimensional matrix allows the coordinates of a point in the unrotated vision coordinate system to be converted to a point in the rotated vision coordinate system. The matrix implements the following equations: $X_R = X(\cos\phi) + Y(\sin\phi)$; $Y_R = X(-\sin\phi) + Y(-\cos\phi)$ wherein $X_R$ and $Y_R$ are $X$ and $Y$ as rotated, respectively. The angle $\phi$ equals the rotation angle between the two coordinate systems. This matrix is set up in block 120. This rotation transforms a vector from vision coordinates to manipulator coordinates.

Next the system must generate a scale factor equal to the ratio between the distance in the vision system and the manipulator system. This scale factor is calculated by dividing the different in R coordinate values between the manipulator systems' first centroid and the current centroid by the length of a vector extending from the first centroid as seen in the vision system to the current centroid as seen in the vision system. The scale factor may then be multiplied by a measured vision distance to arrive at a manipulator system distance. This routine is performed in block 122.

Next a test is performed, as indicated in box 124, to determine if this is the first time through the VSYNC2 routine. If it is the first time, the translation vector from the origin of the manipulator coordinates to the origin of the vision system coordinates is generated in block 126. This operation involves creating a vector from the origin of the vision system coordinates to the first centroid and then rotating that vector by the angle $\phi - \theta$ and scaling it to its equivalent manipulator system coordinates. That vector is then subtracted from a vector extending from the manipulating system origin to the first centroid. The resulting vector components are added to the average translation vector component accumulation locations. The translation vector from the origin of the manipulator coordinates to the origin of the vision system coordinates using the current centroid is now calculated. The resulting vector components are added to the average translation vector component accumulation locations. Finally the system calculates an average translation vector from the vision system origin to the manipulator system origin by dividing each average translation vector component accumulation location by the number of centroids that have been used. This is performed in block 130 and then in 132 return is had to block 72 on FIG. 4.

The routine of FIG. 4 is completed when a number of points equal to the index value set up in block 50 have been completed. The results of the process are a rotation matrix, a scale factor and the vector from the origin of the manipulator system coordinates to the origin of the vision system coordinates. When the vision system later "sees" a point and defines its X and Y coordinates, that point may be expressed in the manipulator system coordinates by drawing a vector in the vision system coordinates to that point, multiplying the vector components by the rotation matrix and scale factor, and adding the resulting vector to the vector between the origins of the two systems. The resulting vector extends from the origin of the manipulator system to the point as seen in the vision system.

Improvements to the present invention are, of course, possible. For example, the visual coordinate system may be generalized to a three dimensional coordinate system by employing a second electrical optical converter having its viewing lens operatively positioned in a horizontal position across the face of the presenter stage 18. Likewise no attempt is here made to limit the type of coordinate system for either the vision or manipulator coordinate systems; rather, any type of coordinate system, conventional or otherwise, may be employed within the scope of the invention. It will be understood, however, that the actual mathematical computation of the transformation factors will vary with the particular coordinate system employed.

Having thus described my invention, I claim:

1. In a workpiece manipulating system having a manipulator with jaw means for engaging a workpiece on a work area, said manipulator having sensor means for indicating the coordinate position of said jaw means in a first coordinate system, and an optical image converter positioned to view an image on the work area and generate a signal in reponse thereto, analyzing means operatively coupled with said converter for computing the coordinate position of the centroid of said image in a second coordinate system, a method for translating coordinate positions from said second coordinate system to coordinate positions in said first coordinate system comprising the steps of:
    placing a target in said jaw means,
    moving said jaw means and target between a predetermined number of points across said work area,
    determining the coordinate position of said target in both of said coordinate systems at each of said points,
    computing transformation factors for translating any coordinate position on said work area in said second coordinate system to the same coordinate position on said work area in said first coordinate system, and
    storing said transformation factors.

2. The method as defined in claim 1 wherein said first coordinate system is a global coordinate system and second system is a rectangular coordinate system having the X–Y plane as its horizontal plane and having the Z axis parallel to the Z axis in said first coordinate system and wherein said target is moved across said work area in a generally horizontal straight line.

3. The method as defined in claim 2 wherein said step of computing transformation factors further comprises the steps of:
    computing a best fit straight line between said points in said second coordinate system,
    calculating a first angle between said best fit line and said X axis in said second coordinate systems, and
    calculating an angle transformation factor by subtracting said first angle from a second angle, said second angle comprising the angle between said best fit line and the X–Z plane in said first coordinate system.

4. The method as defined in claim 3 and further comprising the steps of:
    computing a first distance between the first and last of said predetermined points in said second coordinate system,
    computing a second distance between said first and last predetermined points in said first coordinate system, and
    computing a scale transformation factor by dividing said second distance by said first distance.

5. The method as defined in claim 4 and further comprising the step of calculating a vector transformation factor by computing a vector between the origin of said first coordinate system and the origin of said first coordinate system.

6. The method as defined in claim 3 wherein said best fit line is a least squares best fit line.

7. The method as defined in claim 3 and further comprising the step of constructing a rotation matrix for rotating said coordinate positions in said second coordinate system through said transformation angle.

* * * * *